though the reaction proceeds slowly, without a catalyst, it is decidedly advantageous to employ a suitable catalyst.
United States Patent Office 3,306,816
Patented Feb. 28, 1967

3,306,816
METHOD OF DESTROYING SOIL PATHOGENS
Edward D. Weil, Lewiston, Keith J. Smith, Lockport, and Emil J. Geering, Grand Island, N.Y., assignors to Hooker Chemical Corporation, Niagara Falls, N.Y., a corporation of New York
No Drawing. Filed Aug. 19, 1965, Ser. No. 481,076
3 Claims. (Cl. 167—22)

This is a continuation-in-part of our co-pending application Serial Number 241,184 filed November 30, 1962, which is in turn a continuation-in-part of Serial Number 852,931 filed November 10, 1959, now U.S. Patent 3,259,653.

This invention relates to pentahaloenthanesulfenyl halide and a method for the manufacture thereof. It also relates to compounds of the formula $C_2X_5SX$, where the X's are independently selected from chlorine and bromine.

In accordance with this invention it has been found that pentachloroethanesulfenyl chloride may be produced by chlorination of $CCl_2$=$CClSCl$, which is the subject of co-pending application S.N. 852,931 filed in the U.S. Patent Office on November 16, 1959, of which application the said co-pending application S.N. 241,184/62 is a continuation-in-part.

Chlorination of $CCl_2$=$CClSCl$ may be conducted by reacting gaseous or liquid chlorine or equivalent chlorinating agent with liquid $CCl_2$=$CClSCl$ at suitable temperatures in the range of about —40 degrees to about 150 degrees centigrade. At lower temperatures, the reaction is sluggish; at higher temperatures some decomposition occurs. As to reaction pressure, atmospheric pressure is suitable and subatmospheric pressures may also be employed but a superatmospheric pressure reaction has the advantage of improved reaction rates. Although the reaction proceeds, albeit slowly, without a catalyst, it is decidedly advantageous to employ a suitable catalyst. Among these are Lewis acids, such as ferric chloride, antimony chloride, iodine (converted in situ to iodine chloride); chlorosulfonic acid; and the like. Light also functions as a catalyst. Especially effective are light rays of shorter wave-length, such as those emitted by a mercury vapor lamp.

The reaction is run until the desired weight uptake occurs. The product obtained is purifiable by sublimation and/or by recrystallization, preferably from an inert solvent such as hexane.

Another synthesis is by the substitutive chlorination of tetrachloroethanesulfenyl chloride (which is the subject of copending patent application S.N. 800,981 filed in the U.S. Patent Office on March 23, 1959). This chlorination, which proceeds very slowly without a catalyst, may be conducted at a satisfactory rate by use of a strong organic acid catalyst of the type which is acidic to Congo red indicator. Examples of suitable catalysts include trichloroacetic acid, trifluoroacetic acid, tetrachloroethanesulfonic acid, toluenesulfonic acid, methanesulfonic acid, and ethyl hydrogen sulfate Temperatures in the range of —40 degrees to 150 degrees may be conveniently employed. In place of chlorine, other suitable chlorinating agents, such as sulfuryl chloride and sulfur dichloride, may be used in either of the processes outlined above. Reaction times for the above reactions are usually within the range of ¼ hour to 72 hours, depending on temperatures employed and other factors. Also, the weight of a chemical catalyst may usually be from about 0.1 to 15 percent by weight of the material to be chlorinated. Furthermore, other lower polychloroethanesulfenyl chlorides may be chlorinated to the pentachloroethanesulfenyl chloride by similar procedures.

The bromine analogs of the above-described chlorine compounds are also effective nematocides, fungicides and bactericides. Such compounds include $CCl_3CCl_2SBr$ (prepared by treating $CCl_3CCl_2SCl$ with a saturated solution of HBr in a solvent, such as glacial acetic acid), $CCl_2BrCClBrSCl$ (prepared by addition of bromine to $CCl_2$=$CClSCl$), $CBr_2ClCClBrSCl$ (prepared by addition of elemental chlorine to $CBr_2$=$CBrSCl$), and mixed $C_2Cl_mBr_nSBr$, where $m+n=5$ (prepared by treatment of $CCl_3CCl_2SCl$ with $AlBr_3$, or $AlCl_3$ plus HBr, in a solvent, such as nitromethane). Such mixed chloro bromo products range from $C_2Cl_4$ BrSBr to $C_2Br_5SBr$ depending on the stoichiometry and the reaction time. The methods of using these bromine-containing compositions are similar to the methods to be used for the corresponding chloro-compound.

The perchloro product of the invention is a yellowish crystalline solid, soluble in most of the ordinary organic solvents, and having a characteristic pungent odor. It can be sublimed under vacuum without decomposition. In contrast, to trichloromethane sulfenyl chloride, the product exhibits a notable degree of pesticidal activity per se, and also has utility as a chemical intermediate. It is particularly active as a nematocide and fungicide, and may be used for combination effect crop protection. By "pesticidal" it is meant that the product is fungicidal, nematocidal and antibacterial. It is particularly effective against soil pathogens, such as fungi, nematodes, and soil bacteria and destroys them when applied to the soil or loci thereof.

The present compounds may be used in pure form or may be formulated with other materials. Suitable formulations include solutions in organic solvents with or without surface-active agents to faciliate dispersion in water. Suitable solvents include aromatic and aliphatic hydrocarbons such as xylenes and naphthas, chlorinated solvents such as carbon tetrachloride, and brominated solvents such as ethylenedibromide. Pentachloroethanesulfenyl chloride may also be formulated with solid carriers, either powders or granules, such as clay, talc, vermiculite, sawdust, ground corn cobs, and the like. In liquid preparations from ½ to 90 percent by weight of pentachloroethanesulfenyl chloride is preferably employed and in dispersion on solid carriers from ½ to 95 percent is found most useful. Synthetic surface active agent present, usually an organic anionic or nonionic wetting agent of the lower alkylene oxide (nonionic) or sulfonated type (anionic), may be in proportion of .1 to 20 percent of the final product As a chemical intermediate, pentachloroethanesulfenyl chloride may be reacted with nucleophiles such as salts of imides, cyanide, thiocyanate, sulfide, mercapatides, phosphites, and the like, to replace the chlorine atom attached to the sulfur by the nucleophilic groups employed.

The following examples are given to illustrate the invention but are not to be considered as limitations thereof. All parts given in the examples, specification and claims are by weight, and all temperatures are in degrees centigrade, unless otherwise indicated.

*Example 1.—Preparation of pentachloroethanesulfenyl chloride by chlorination of trichlorovinylsulfenyl chloride with gaseous chlorine*

Into a mixture of 1 gram of anhydrous $FeCl_3$ and 19.8 grams trichlorovinylsulfenyl chloride at room temperature was passed a stream of chlorine. The temperature was allowed to rise to 135 degrees centigrade. As the chlorination neared completion, the temperature dropped to room temperature. The gain in weight was the theoretical 7.1 grams. The reaction mixture was gently warmed and filtered to remove inorganic solids, then stripped free of low boiling contaminants by warming to 73 degrees centigrade at 0.1 millimeters of mercury. At this point, the product began to sublime. The sublimate was a yellowish pungent solid, with a melting point of 78 degrees centigrade. It analyzed 79.2 percent Cl and 11.1 percent S, compared to a calculated chlorine content of 79.1 percent and sulfur content of 11.9 percent. The infrared spectrum analysis showed the product to be free of carbon-to-carbon double bonds, thus confirming the structure.

*Example 2.—Preparation of pentachloroethanesulfenyl chloride by chlorination of trichlorovinylsulfenyl chloride with liquid chlorine*

19.8 grams of trichlorovinylsulfenyl chloride were added to 213 grams of liquid chlorine at its boiling point (about 33 degrees centigrade) in an open Dewar flask in the presence of ferric chloride, and the chlorine was allowed to evaporate off slowly. To the residual solid was added enough carbon tetrachloride to dissolve the organic crystals and the ferric chloride was removed by filtration. The carbon tetrachloride was evaporated and the residual mixture of liquid and crystalline solid was stripped to 50 degrees centigrade at 1 millimeters of mercury pressure. The undistilled residue comprised a yellowish crystalline solid, having the properties and analysis of the product described in Example 1.

*Example 3.—Preparation of pentachloroethanesulfenyl chloride by catalytic chlorination of tetrachloroethanesulfenyl chloride*

Into a mixture of 100 parts of tetrachloroethanesulfenyl chloride (produced as described in co-pending application S.N. 800,981) and 2 parts of trichloroacetic acid catalyst was passed a stream of chlorine at 25–30° centigrade for 2 days. The weight increase was substantially the theoretical for monochlorination. The product, a yellowish solid mass, was shown by infrared and gas chromatography to be identical to the product of Example 1.

*Example 4.—Use as a foliar fungicide*

Tomato plants inoculated with spores of *Alternaria solani* were sprayed with an 0.04 percent aqueous dispersion of pentachloroethanesulfenyl chloride. Similar inoculated plants were left unsprayed. Two weeks later when severe symptoms of early blight disease were observed on the inoculated unsprayed plants, the sprayed plants were substantially disease free.

*Example 5.—Use as a soil fungicide*

Soil heavily infested with damping-off organisms, notably pythium fungi, was admixed with pentachloroethanesufenyl chloride at a concentration of 50 parts per million. Peas planted in the treated soil germinated and emerged normally, whereas peas planted in the same soil without the chemical treatment damped off and failed to emerge.

*Example 6.—Use as a nematocide*

Soil heavily infested with nematodes (*Meloidogyne incognita*) was admixed with pentachloroethanesulfenyl chloride at 125 parts of chemical per million parts of soil. Cucumber seedlings planted in this treated soil showed substantially less damaged from root knotting caused by nematodes than did similar seedlings planted in the same soil without the chemical treatment.

In a similar manner, pentachloroethanesulfenyl bromide is applied to the soil at 125 p.p.m. to obtain control of root knotting caused by nematodes.

*Example 7.—Pesticidal formulation*

A formulation suitable for use as a nematocide was prepared by blending the following:

| | Parts |
|---|---|
| Pentachloroethanesulfenyl chloride | 10 |
| Mineral spirits | 90 |

*Example 8.—Pesticidal formulation*

A wettable powder formulation suitable for pesticidal use was prepared by grinding together the following ingredients in a hammer mill:

| | Parts |
|---|---|
| Pentachloroethanesulfenyl chloride | 50 |
| Naphthalenesulfonate wetting agent (Sorbit P) | 3 |
| Ligninsulfonate dispersing agent (Marasparse N) | 6 |
| Synthetic clay (Microcel E) | 41 |

When employed in soil treatment in proportion sufficient to supply a pesticidal quantity of pentachloroethanesulfenyl chloride, the above products, of Examples 7 and 8, effectively destroy soil pathogens and provide a useful means for their control.

The invention has been described with respect to preferred embodiments but it is clear that variations thereof may be employed and equivalents may be substituted without going beyond the purview of the invention or outside the scope of the claims.

What is claimed is:

1. A method of destroying soil pathogens which comprises treating the loci of said pathogens with an effective amount of a compound of the formula $C_2X_5SX$, where the X's are selected from the group consisting of chlorine, bromine and mixtures thereof.

2. A method for destroying soil pathogens which comprises treating the loci of said pathogens with an effective amount of pentachloroethanesulfenyl chloride.

3. A method for destroying soil pathogens which comprises treating the loci of said pathogens with an effective amount of pentachloroethanesulfenyl bromide.

No references cited.

JULIAN S. LEVITT, *Primary Examiner.*

STANLEY J. FRIEDMAN, *Assistant Examiner.*